W. D. SMITH.
HEAT REGULATING SYSTEM.
APPLICATION FILED JAN. 29, 1908.
990,602.
Patented Apr. 25, 1911.
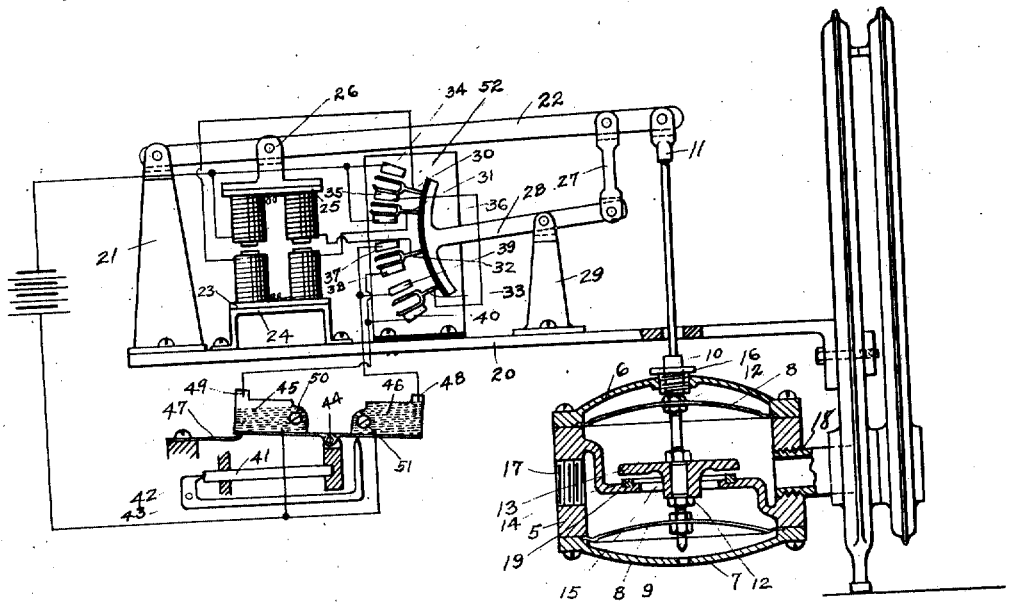
WITNESSES:
INVENTOR.
William Douglas Smith

UNITED STATES PATENT OFFICE.

WILLIAM DOUGLAS SMITH, OF CHICAGO, ILLINOIS.

HEAT-REGULATING SYSTEM.

990,602.

Specification of Letters Patent. Patented Apr. 25, 1911.

Application filed January 29, 1908. Serial No. 413,293.

*To all whom it may concern:*

Be it known that I, WILLIAM DOUGLAS SMITH, a subject of the King of Great Britain, residing at Chicago, in the county of Cook and State of Illinois, have invented new and useful Improvements in Heat-Regulating Systems, of which the following is a specification.

My invention relates to improvements in heat regulating systems, and has for its salient object to provide a system of the character described which may be operated with a very small amount of power and that that amount will be practically constant under all conditions.

It is adapted to be operated by electric power thus affording a system easy of application and well adapted for domestic use as well as in buildings for business and other purposes.

Furthermore, it is my object to provide a device of the character described which is simple in construction and which may be manufactured and installed at a small cost.

Other and further objects of my invention will best become apparent from the following description taken in conjunction with the accompanying drawings, wherein: the figure is an elevation of an electrical operating device connected to a valve, which is shown in sectional elevation through its center.

Throughout the figures like numerals of reference refer always to like parts.

In the drawing, 5, indicates a valve shell, the plan view of which is preferably circular in contour, having the top portion, 6, and the bottom portion, 7, jointed to 5 for convenience of manufacture and for attaching a double acting spring diaphragm, 8 of suitable material preferably of phosphor bronze at each of these points. It will be understood that by the said term "double acting spring diaphragm", as hereinafter used, I contemplate a diaphragm the central part of which is capable of motion in directions substantially perpendicular to the plane of the diaphragm, a certain distance on either side of a neutral point, and when the said central part is placed in a position just past the said neutral point on either side, it exerts a pressure in the direction of increasing its distance from the said neutral point.

9, indicates a valve spindle, passing through the diaphragm and valve, consisting of two parts joined with a coupling, 10, and having an end connection, 11 at the top engaging with the lever 22.

12 are nuts to secure the spindle to the diaphragms.

13, is a valve also secured on the spindle by nuts 12.

14 indicates a valve seat around the opening 15, of suitable material preferably metal or vulcanized rubber.

16 indicates a hollow adjustable stop through which the coupling 10, may slide, and is screwed into the shell 6, to form a stop against which the nut 12, may rest, thus providing means for regulating the amount of opening of the valve.

17, indicates an inlet opening, 18 an outlet opening, each tapped suitable for attaching pipes.

19 indicates a dividing partition between the inlet and outlet openings.

20 is a bracket which may be of cast iron or other suitable material, adapted for clamping to the end section of a radiator.

21, a bracket supporting the lever 22.

23 is a stationary electro-magnet supported upon the stand 24.

25 is a movable electro-magnet connected to the lever connection 26, which is pivotally connected to lever 22.

27, is a link pivotally connected to each of the levers 22 and 28, 28 is a lever pivotally mounted on the bracket 29 and carrying contact springs 30, 31, 32 and 33 secured to and insulated from its end opposite to the connecting link; 34, 35, 36, 37, 38, 39 and 40 are suitable contact pieces for making connections in an electric circuit, each should be provided with binding screws, and have a bolt and nut on the back suitable for clamping, and they should be mounted on a suitably supported plate of insulating material 52, having a long curved slot so that they may be adjusted and clamped in desirable positions for closing and breaking the circuits through the reciprocating contact springs.

41 is a piece of highly expansible material fixed at one end, the other end of which is free to move as expansion or contraction occurs; one end of the lever 42, fulcrumed at 43 engages the movable end of 41, the other end of 42 engages a lever 44, which is pivotally mounted and has two bent tubes of suitable material secured to it, each bent tube containing a suitable electricity conducting liquid, 45 and 46, preferably mercury, the lower portions of the mercury columns 45 and 46 are connected in a circuit and when the mercury comes in contact with either 48 or 49 it closes an electric circuit. The spring 47 presses on the under side of the mercury tube retaining the mercury device in a position as illustrated in Fig. 1 of the drawings.

The action of this apparatus is as follows: As shown it indicates the positions at low temperature, the electro-magnets having opened the valve to allow the heat medium to pass through it, the circuit breakers have broken the circuits and placed the contacts in positions so that as soon as the temperature rises the thermostat will make contact at 49 and the upper electro-magnet will be drawn downward, just before it reaches the middle of its closing action, in order to provide clearance between the contact spring 30, and contact blocks 34 and 35, and also between the contact spring 31 and contact blocks 35 and 36 the circuit in the lower electro-magnet 23 will be broken. The valve being at this time in a position where it is easily moved the upper electro-magnet will pull it over the neutral point of the double acting spring diaphragms, which will then complete the action of closing the valve. The circuit may be broken in the upper electro-magnet at any time after the double acting spring diaphragms pass the neutral point of their action, by adjusting the contact block 38 to break contact with the spring 32. The spring contact 30 reciprocating between the contact blocks 34 and 35, and the spring 31 reciprocating between the contact blocks 35 and 36 act to reverse the poles in the lower electro-magnet. The spring contacts 30 and 31 being arranged so that they make contact with their contact blocks during almost half the stroke each way. The spring contact 32 reciprocating between contact blocks 37 and 38 acts as a circuit breaker for the upper electro-magnet 25. The spring contact 33 reciprocating between contact blocks 39 and 40 acts as a circuit breaker for the lower electro-magnet 23.

Referring to the valve the upper diaphragm 8, in addition to coöperating with the electro-magnets for the operation of the valve, avoids the use of a stuffing box, and thereby eliminates uncertain frictions. The utility of the lower diaphragm is to neutralize the effect of the steam pressure, or other pressures, on the underside of the valve, thus the force required to open or close the valve, is the same under all conditions of pressure. It is not necessary that both be double acting spring diaphragms, but in practice it will be more convenient to have both alike.

The purpose of the screws 50 and 51, which protrude into the mercury columns 45 and 46, is to raise or lower the mercury in either of the upstanding legs of the tubes so that contacts with 48 and 49 may be made at any desirable temperature.

Having thus described my invention, what I claim and desire to secure by Letters Patent, of the United States, is:

1. In a heat regulating system a valve adapted when in one position to open a passage from a source of heat and when in another position to close the said passage, means adapted to use electricity to cause motion of the valve for part of its travel from one to the other of said positions, either way, means for storing potential energy and means for utilizing the potential energy thus stored to cause the valve to complete its travel, either way, between its closed and open positions, an electric switch, means adapted to use electricity to cause motion of the switch for part of its travel between contact points, either way, means adapted to utilize potential energy to complete the said travel of the switch between contact points, either way, in combination with a thermostat adapted to close electric circuits at predetermined temperatures.

2. In a heat regulating system, a valve adapted when in one position to open a passage from a source of heat and when in another position to close the said passage, means adapted to use electricity to cause motion of the valve from one to the other of said positions, an electric switch means adapted to use electricity to cause motion of the switch for part of its travel between contact points, means for storing potential energy and means for utilizing the potential energy thus stored to complete the travel of the said switch between contact points in combination with a thermostat adapted to close electric circuits at predetermined temperatures.

3. In a heat regulating system a valve adapted when in one position to close a passage from a source of heat and when in another position to open the said passage, an electric switch adapted when in one position to close a circuit and when in another position to close a different circuit, mechanical connection between the valve and switch so that they move in unison, means adapted to use electricity to cause the switch to travel part of the distance between its contact points each way, means for storing energy to complete the travel of the switch between contacts each way, in combination with a thermostat adapted to close electric circuits at predetermined temperatures.

WILLIAM DOUGLAS SMITH.

Witnesses:
 JOHN C. PARSONS,
 FRANK E. KING.